No. 827,971. PATENTED AUG. 7, 1906.
S. GRAY.
BUTTON.
APPLICATION FILED FEB. 11, 1905.
2 SHEETS—SHEET 1.
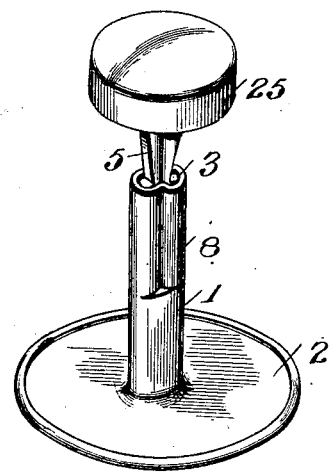
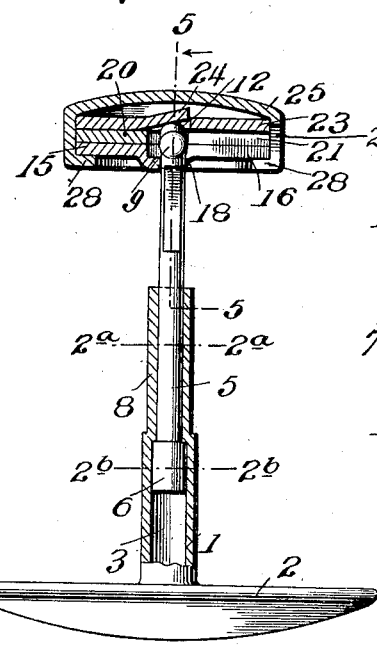
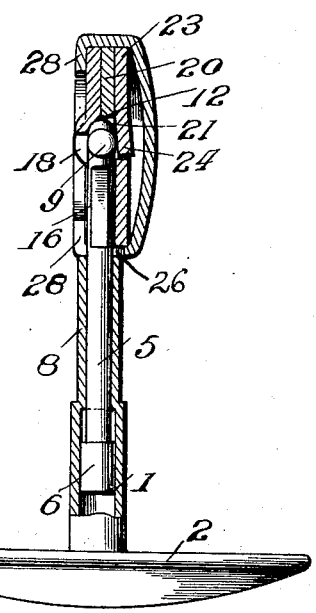
Witnesses
M. R. Tanner.
Inventor
Samuel Gray
By Robertson & Johnson
Attorneys

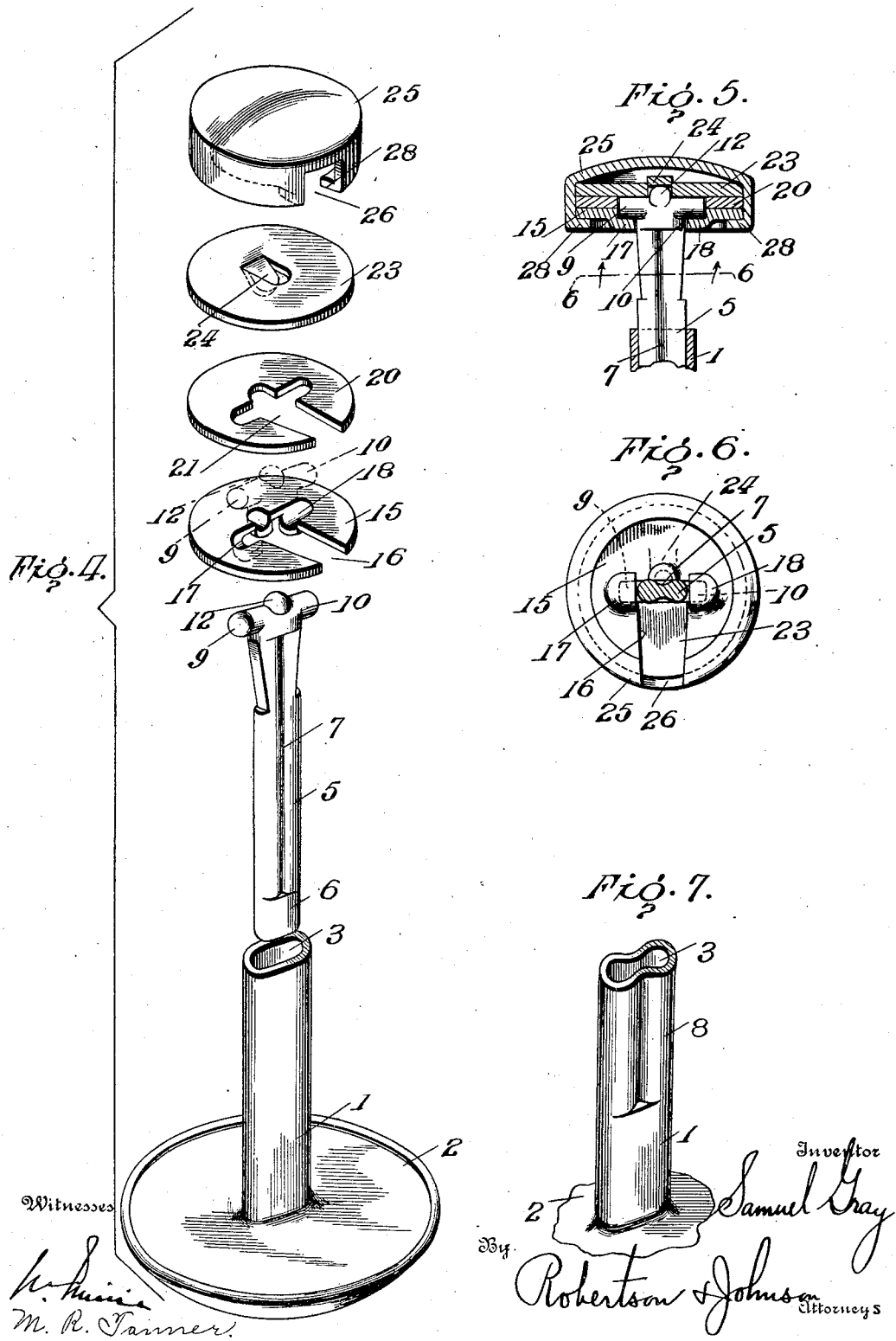

UNITED STATES PATENT OFFICE.

SAMUEL GRAY, OF HARRISBURG, PENNSYLVANIA.

BUTTON.

No. 827,971.   Specification of Letters Patent.   Patented Aug. 7, 1906.

Application filed February 11, 1905. Serial No. 245,274.

*To all whom it may concern:*

Be it known that I, SAMUEL GRAY, of Harrisburg, in the county of Dauphin and State of Pennsylvania, have invented certain new and useful Improvements in Buttons, of which the following is a specification.

This invention relates to certain new and useful improvements in collar-buttons.

The objects of the invention are to provide a button which will be easily extended in order that its head may be passed more easily through a series of buttonholes and to form the button in such a manner that the head may be moved in the same plane as the shank or stem, so that as the head is pushed through a heavy collar or collar-band most if not all of the strain will be removed from the pivotal connection between the head and the shank or stem.

My invention therefore consists of a button of these characteristics, and the invention will be now more particularly hereinafter described and then definitely claimed.

In the accompanying drawings, which show the preferable embodiment of my invention, Figure 1 is a perspective view of my new button. Fig. 2 and 3 are vertical sections with the head in different positions. Fig. 2ᵃ is a horizontal section through the line 2ᵃ 2ᵃ, and Fig. 2ᵇ is a similar section through the line 2ᵇ 2ᵇ, of Fig. 2. Fig. 4 is a perspective view of all of the parts detached. Fig. 5 is a section of the head, taken at right angles to that shown in Figs. 2 and 3. Fig. 6 is a bottom plan of the head, the shank or stem being shown in section. Fig. 7 is a perspective view of the shank after it is crimped.

Referring now to the details of the drawings by numerals, 1 designates the shank of my new button, which is secured to or formed on the base 2 in any desired manner. The shank is of course provided with a central aperture or opening 3, and within this opening is located the stem 5, which is extensible or telescopes in and out of the shank. In order to permit this stem to be "extensible" and at the same time to prevent it from being entirely withdrawn from the shank, the shank and stem are formed in the special manner indicated in my drawings. As there illustrated it will be observed that the lower part 6 of the shank (see particularly Fig. 4) is substantially oval shape, while the remainder of the shank has a central groove on each side and is thus shaped in cross-section something like a figure 8. When the shank 1 is first made, it is of the same shape as the lower portion of the stem. In other words, it also is oval shape and is of that shape for its entire length; but after the stem 5 is placed within the shank 1 the upper portion 8 of the latter is crimped by any suitable machine, so that said upper part is also in cross-section the same shape as the upper part of the stem 5. Figs. 2ᵃ and 2ᵇ show the shape of the upper and lower portions, respectively, of the stem and its shank after they are secured together. Inasmuch as the shank 1 is made of somewhat "springy" metal, after its upper portion has been shaped by a proper machine it hugs the stem 5 with sufficient resiliency to maintain any position to which it is moved in the shank. The purpose of making the lower part 6 of the stem of different configuration from the upper part and also of forming the shank in the same manner is that the crimped portion of the shank forms a stop for the uncrimped portion of the stem, and thus prevents the stem from being withdrawn entirely from said shank. This is very clearly shown in each of Figs. 2 and 3.

The upper extremity of the stem 5 is formed with the usual lugs 9 and 10, and above them and on top of the extremity of the stem is formed a small projection 12. Instead of securing these lugs 9 and 10 directly to a pivoted head or to a piece secured thereto I employ a disk 15, formed with a radial slot 16 of substantially the width of the extremity of the shank 5, and the central portion of this disk is punched downward, thus forming two pockets or sockets 17 and 18, (see Fig. 6,) in which the lugs 9 and 10 of the stem find a bearing. Placed immediately over the disk 15 is a second disk 20, formed with a T-shaped slot 21 therein, which disk acts as a filler and yet permits the free movement of the parts on the lugs 9 and 10. There is yet one more disk 23 located over the disk 20; but this disk is merely formed with an integral tongue, with which coacts the small projection 12, formed on the top of the upper extremity of the stem 5. Around all of these parts is the inclosing cap or head 25, which before being placed in position is an ordinary cup-shaped cap with a recess 26 in its vertical flange, as clearly illustrated in Fig. 4. After this cap is placed over the other described parts the lower edge 28 of the vertical flange of the head is turned under the remaining parts, thus holding them all within the head and preventing all movement but a pivotal movement on the lugs 9 and 10. The special purpose of cutting away the flange of the head to form the recess 26 and of forming the openings in the disks 20 and 16 is to make it possible when the head is turned in the position to be projected through a buttonhole for the head and stem to be in the same vertical plane, as illustrated in Fig. 3. When in this position, pressure against a collar causes the stem to pass into the shank until the head rests against the shank, (see Fig. 3,) when all of the strain caused by jamming the head through several buttonholes is transmitted in a vertical line to the stem and shank, and there is therefore no strain on the pivotal joint. I deem this of great importance.

What I claim as new is—

1. In a button, the combination with a shank and stem shaped to slide one within the other, the outer member having its upper part crimped or formed of irregular contour, and the opposing member having its end formed of smooth or regular contour, whereby one acts to prevent the complete withdrawal of the other, when extended, substantially as described.

2. In a button, the combination of a shank and stem shaped to slide frictionally one within the other, the outer member having a portion longitudinally crimped or formed of irregular contour, and the opposing member having a portion also similarly longitudinally crimped or formed of irregular contour, substantially as described.

3. In a button, the combination of a shank and stem shaped to slide one within the other, the outer member having its upper portion only crimped or formed of irregular contour and its lower portion formed of regular contour, and the opposing member having its upper portion crimped or formed of irregular contour and its end formed of smooth or regular contour, substantially as described.

4. In a button, the combination of a shank and stem shaped to slide frictionally one within the other, the outer member having a portion longitudinally crimped or formed of irregular contour, and the opposing member having a portion also similarly longitudinally crimped or formed of irregular contour, a head pivoted to the extensible portion, and having a recess permitting it to move, when the parts are extended, in alinement with the shank so as to rest thereupon, substantially as described.

Signed by me at Harrisburg, Pennsylvania, this 7th day of February, 1905.

SAMUEL GRAY.

Witnesses:
ANDREW S. MCCREATH, Jr.,
PAUL M. SWARTZ.